US012520378B2

(12) United States Patent
Zhang et al.

(10) Patent No.: US 12,520,378 B2
(45) Date of Patent: Jan. 6, 2026

(54) METHODS AND APPARATUS TO SET INITIAL PDCP STATE VARIABLES FOR MULTICAST

(71) Applicant: MediaTek Singapore Pte. Ltd., Singapore (SG)

(72) Inventors: Xiaonan Zhang, Beijing (CN); Yuanyuan Zhang, Beijing (CN); Xuelong Wang, Beijing (CN)

(73) Assignee: MEDIATEK Singapore Pte. Ltd, Singapore (SG)

( * ) Notice: Subject to any disclaimer, the term of this patent is extended or adjusted under 35 U.S.C. 154(b) by 543 days.

(21) Appl. No.: 18/046,110

(22) Filed: Oct. 12, 2022

(65) Prior Publication Data

US 2023/0134356 A1 May 4, 2023

Related U.S. Application Data

(63) Continuation of application No. PCT/CN2021/012385, filed on Oct. 14, 2021.

(30) Foreign Application Priority Data

Oct. 14, 2021 (WO) ................ PCT/CN2021/012385
Sep. 16, 2022 (CN) .......................... 202211132164.0

(51) Int. Cl.
*H04H 20/71* (2008.01)
*H04W 76/40* (2018.01)

(52) U.S. Cl.
CPC .................................. *H04W 76/40* (2018.02)

(58) Field of Classification Search
USPC ......................................................... 370/312
See application file for complete search history.

(56) References Cited

U.S. PATENT DOCUMENTS

| 2020/0092939 A1 | 3/2020 | Kim ...................... H04W 76/19 |
| 2021/0067960 A1 | 3/2021 | Lee ........................ H04W 12/00 |

(Continued)

FOREIGN PATENT DOCUMENTS

| CN | 113163342 A | 1/2020 |
| CN | 111901766 | 4/2020 |

(Continued)

OTHER PUBLICATIONS

Taiwan Intellectual Property Office Action, dated Jan. 10, 2023 (6 pages).

(Continued)

*Primary Examiner* — Chuong T Ho
(74) *Attorney, Agent, or Firm* — Helen Mao; Imperium Patent Works

(57) ABSTRACT

Apparatus and methods are provided for setting initial PDCP state variables for multicast services. In one novel aspect, the UE sets initial PDCP state variables for the MBS session based on configuration values received from the network. In one embodiment, the UE receives dedicated RRC signaling from the network, which contains initial HFN value and the SN of the next PDCP PDU to be transmitted. In one embodiment, the one or more configuration values are provided in RRC Reconfiguration, RRCResume, or RRC-Setup message, according to different RRC states of UE. In one embodiment, the UE initializes the RX_DELIV value based on the configuration value of HFN and SN received from the wireless network. When receiving the one or more configuration values of initial PDCP state variables, UE sets HFN to initial HFN value and sets RX_DELIV to the COUNT value of next PDCP PDU to be transmitted by network.

18 Claims, 7 Drawing Sheets

(56) References Cited

U.S. PATENT DOCUMENTS

| | | | |
|---|---|---|---|
| 2023/0097118 A1* | 3/2023 | Tseng | H04W 24/08 370/329 |
| 2023/0254666 A1* | 8/2023 | Qi | H04W 28/0268 370/329 |
| 2023/0262734 A1* | 8/2023 | Qi | H04L 12/189 455/414.1 |
| 2023/0276470 A1* | 8/2023 | Di Girolamo | H04W 4/06 370/312 |
| 2023/0396368 A1* | 12/2023 | Zhang | H04L 1/1657 |
| 2024/0015849 A1* | 1/2024 | Teyeb | H04W 76/20 |
| 2024/0179798 A1* | 5/2024 | Fujishiro | H04W 76/40 |
| 2024/0187140 A1* | 6/2024 | Di Girolamo | H04L 1/188 |
| 2024/0260063 A1* | 8/2024 | Fujishiro | H04W 76/11 |
| 2024/0260124 A1* | 8/2024 | Fujishiro | H04W 76/27 |

FOREIGN PATENT DOCUMENTS

| | | |
|---|---|---|
| CN | 111901766 A | 4/2020 |
| WO | WO2021/168257 | 2/2020 |
| WO | WO2021194219 A1 | 3/2020 |
| WO | WO2021194324 A1 | 3/2020 |

OTHER PUBLICATIONS

Taiwan Intellectual Property Office Action, dated Sep. 14, 2023 (6 pages).

ZTE, Sanechips, "Miscellaneous L2 centric issues on NR MBS", 3GPP TSG-RAN WG2 Meeting 115 electronic R2-2107338, Online, Aug. 9-Aug. 27, 2021.Sec.2o.

China Intellectual Property Office Action notice of allowance 202211132164.0, dated Jun. 6, 2024.

3GPP TSG-RAN WG2 Meeting #115 electronic R2-2107338 ZTE, Miscellaneous L2 centric issues on NR MBS.

3GPP tsg_ran\wg2_rl2, Huawei, HiSilicon, "R2-2108126".

3GPP tsg_ran\wg2_rl2, Mediatek Inc., "R2-2107120 Initialization of RLC and PDCP windows".

3GPP tsg_ran\wg2_rl2, Mediatek Inc., "R2-2109026 Summary of [Pre115-e][002] [MBS] 8.1.2.3 L2 Centric Other".

3GPP tsg_ran\wg2_rl2, "R2-2107797 PDCP and RLC initialization for MBS reception".

European Intellectual Property Office Action, dated Feb. 16, 2023 (10 pages).

ZTE et al: "Miscellaneous L2 centric issues on NR MBS", 3GPP Draft; R2-2107338,3$^{rd}$ Generation Partnership Proect(3GPP),. Mobile Cometence Center;650, Route Des Lucioles; F-06921 Sophia-Antipolis Cedex; France Aug. 6, 2021, XP052034063.

Mediatek Inc: "Summary of 8.1.2.3 L2 Centric Other", 3GPP Draft; R2-2109026,3$^{rd}$ Generation Parternship Project (3GPP), Mobile Cometence Center;650, Route Des Lucioles; F-06921 Sophia-Antipolis Cedex; France Aug. 14, 2021 XP052043071.

Mediatek Inc: "Initialization of RLC and PDCP windows", 3GPP Draft; R2-2107120,3$^{rd}$ Generation Parternship Project (3GPP), Mobile Cometence Center;650, Route Des Lucioles; F-06921 Sophia-Antipolis Cedex; France Aug. 14, 2021 XP052043071.

* cited by examiner

METHODS AND APPARATUS TO SET INITIAL PDCP STATE VARIABLES FOR MULTICAST

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN/2021/123856, titled "Methods and apparatus to set Initial PDCP State Variables for Multicast," with an international filing date of Oct. 14, 2021. This application claims priority under 35 U.S.C. § 119 from Chinese Application Number CN 202211132164.0 titled "Methods and apparatus to set Initial PDCP State Variables for Multicast," filed on Sep. 16, 2022. The disclosure of each of the foregoing documents is incorporated herein by reference.

TECHNICAL FIELD

The disclosed embodiments relate generally to wireless communication, and, more particularly, to set initial packet data convergence protocol (PDCP) state variables for multicast.

BACKGROUND

With the exponential growth of wireless data services, the content delivery to large mobile user groups has grown rapidly. Various cellular systems, including both 4G/long term evolve (LTE) system and 5G/new radio (NR) systems, may provide a multicast functionality, which allows user equipments (UEs) in the system to receive multicast services transported by the cellular system. A variety of applications may rely on communication over multicast transmission, such as live stream, video distribution, vehicle-to-everything (V2X) communication, public safety (PS) communication, file download, and so on. When UE establishes multicast radio bearer (MRB), hyper frame number (HFN) needs to be synchronized between the wireless network and the UE. It is also necessary to set initial value of packet data convergence protocol (PDCP) receiving window. In the legacy system, the initial values of the variables for transmit and receive operation at the PDCP layer are deterministic and usually starts from zero because data transmission/reception starts after UE is in the RRC CONNECTED state. In the NR multicast, the UE may join the multicast and broadcast service (MBS) session after the MBS session activation, which implies that the PDCP packets transmission over the air interface has been on-going for a while. Therefore, the UE cannot initialize the PDCP variables as usual for the MBS session.

Improvements and enhancements are required to initialize PDCP state variables for multicast services.

SUMMARY

Apparatus and methods are provided for setting initial PDCP state variables for multicast services. In one novel aspect, the UE sets initial PDCP state variables for the MBS session based on configuration values received from the network. In one embodiment, the UE receives dedicated RRC signaling from the network, which contains initial HFN value and the SN of the next PDCP PDU to be transmitted. In one embodiment, the one or more configuration values are provided in RRC Reconfiguration message. In one embodiment, the one or more configuration values are provided in RRCResume, or RRCSetup message, according to different RRC states of UE. In one embodiment, the UE initializes the RX_DELIV value based on the configuration value of HFN and SN received from the wireless network. When receiving the one or more configuration values of initial PDCP state variables, UE sets HFN to initial HFN value and sets RX_DELIV to the COUNT value of next PDCP PDU to be transmitted by network. In another embodiment, the UE stores one or more PDCP packet data units (PDUs) in a reception buffer when the one or more PDCP PDUs are received before receiving one or more configuration values for PDCP state variables from the wireless network.

In another embodiment, the gNB receives a join request from a UE to join an active MBS session, wherein the MBS session is served with an MRB, and wherein the gNB and the UE has a unicast connection for feedback; sends one or more configuration values for PDCP state variables to the UE, wherein the PDCP state variables control PDCP transceiving for the MBS session; and receives feedback from the UE regarding reception information of the MBS session.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technologies. NR may support various wireless communication services, such as enhanced mobile broadband targeting wide bandwidth, millimeter wave targeting high carrier frequency, massive machine type communications targeting non-backward compatible MTC techniques, and/or mission critical targeting ultra-reliable low-latency communications. These services may include latency and reliability requirements. These services may also have different transmission time intervals (TTI) to meet respective quality of service (QoS) requirements. In addition, these services may co-exist in the same subframe. Several aspects of telecommunication systems will now be presented with reference to various apparatus and methods. These apparatus and methods will be described in the following detailed description and illustrated in the accompanying drawings by various blocks, components, circuits, processes, algorithms, etc., collectively referred to as "elements". These elements may be implemented using electronic hardware, computer software, or any combination thereof. Whether such elements are implemented as hardware or software depends upon the particular application and design constraints imposed on the overall system.

Figure 1:
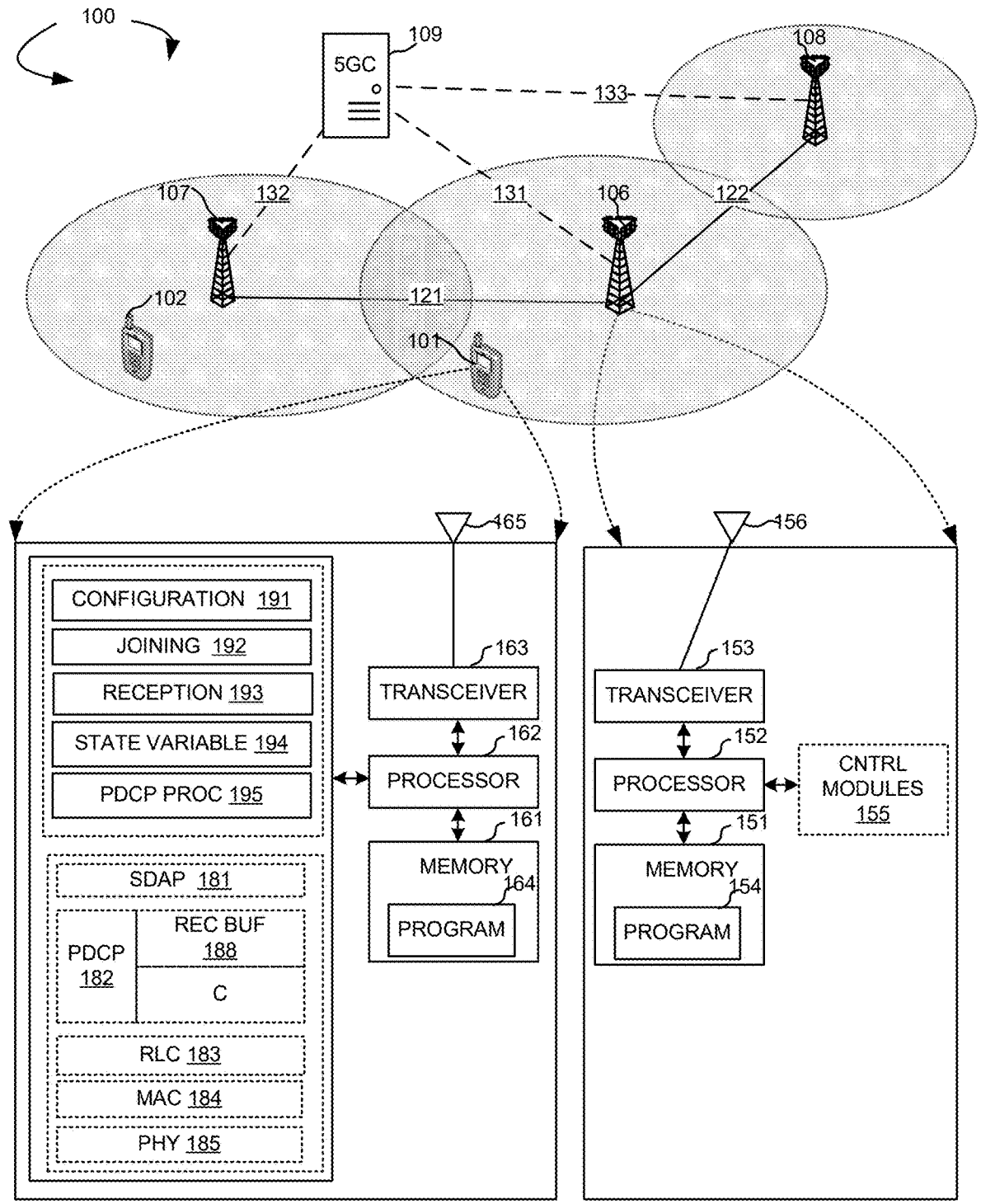
FIG. 1 is a schematic system diagram illustrating an exemplary wireless communication network where the UE initializes the PDCP state variables for multicast based on configurations received from the wireless network.

FIG. 1 is a schematic system diagram illustrating an exemplary wireless communication network where the UE initializes the PDCP state variables for multicast based on configurations received from the wireless network. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively. In one embodiment, gNB 106 and gNB 107 provide the same MBMS services. The service continuity during handover is guaranteed when UE 101 moves from gNB 106 to gNB 107 and vice versa. The area covered by gNB 106 and 107 with the same MBMS services is a multi-cast service area for the MBMS services.

FIG. 1 further illustrates simplified block diagrams of a base station and a mobile device/UE for multicast transmission. gNB 106 has an antenna 156, which transmits and receives radio signals. An RF transceiver circuit 153, coupled with the antenna 156, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. These control modules can be implemented by circuits, software, firmware, or a combination of them.

FIG. 1 also includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver 163 may comprise two RF modules (not shown) which are used for different frequency bands transmitting and receiving. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. A configuration module 191 configures an MRB for one or more multicast and broadcast services (MBSs) in a wireless network, wherein an MRB configuration enables feedback for the one or more MBSs. A joining module 192 initiates a join procedure to join an MBS session, wherein the MBS session is active. A reception module 193 receives one or more configuration values for packet data convergence protocol (PDCP) state variables from the wireless network, wherein the PDCP state variables control PDCP transceiving for the MBS session. A state variable module 194 configures PDCP state variables based on the received one or more configuration values. A PDCP processing module 195 stores one or more PDCP packet data units (PDUs) in a reception buffer when the one or more PDCP PDUs are received before receiving one or more configuration values for PDCP state variables from the wireless network.

In one embodiment, the UE further has an RRC state controller, an MBS controller, and a protocol stack controller. RRC state controller controls UE RRC state according to commands from the network and UE conditions. RRC supports the following states, RRC_IDLE, RRC_CONNECTED and RRC_INACTIVE. In one embodiment, UE can receive the multicast and broadcast services in RRC_IDLE/INACTIVE state. The UE applies the MRB establishment procedure to start receiving a session of a service it has an interest in. The UE applies the MRB release procedure to stop receiving a session. MBS controller controls to establish/add, reconfigure/modify and release/remove a MRB based on different sets of conditions for MRB establishment, reconfiguration, and release. A protocol stack controller manages to add, modify, or remove the protocol stack for the MRB. The protocol Stack includes the packet data convergence protocol (PDCP) layer 182, the radio link control (RLC) 183, the MAC layer 184 and the PHY layer 185. In one embodiment, the service data adaptation protocol (SDAP) layer 181 is optionally configured.

In one embodiment, the PDCP layer supports the functions of transfer of data, maintenance of PDCP sequence number (SN), header compression and decompression using the robust header compression (ROHC) protocol, ciphering and deciphering, integrity protection and integrity verification, timer based SDU discard, routing for split bearer, duplication, re-ordering, in-order delivery, out of order delivery and duplication discarding. The PDCP entity includes a reordering buffer 188 and a status reporter 189. In one embodiment, the receiving PDCP entity sends PDCP status report upon t-Reordering expiry. In one embodiment, the PDCP status reports triggers PDCP retransmission at the peer transmitting PDCP entity at the network side.

In one embodiment, the RLC layer 183 supports the functions of error correction through ARQ, segmentation and reassembly, re-segmentation, duplication detection, re-establishment, etc. In one embodiment, a new procedure for RLC reconfiguration is performed, which can reconfigure the RLC entity to associated to one or two logical channels. In another embodiment, the MAC layer 184 supports mapping between logical channels and transport channels, multiplexing, demultiplexing, HARQ, radio resource selection, and etc.

Figure 2:
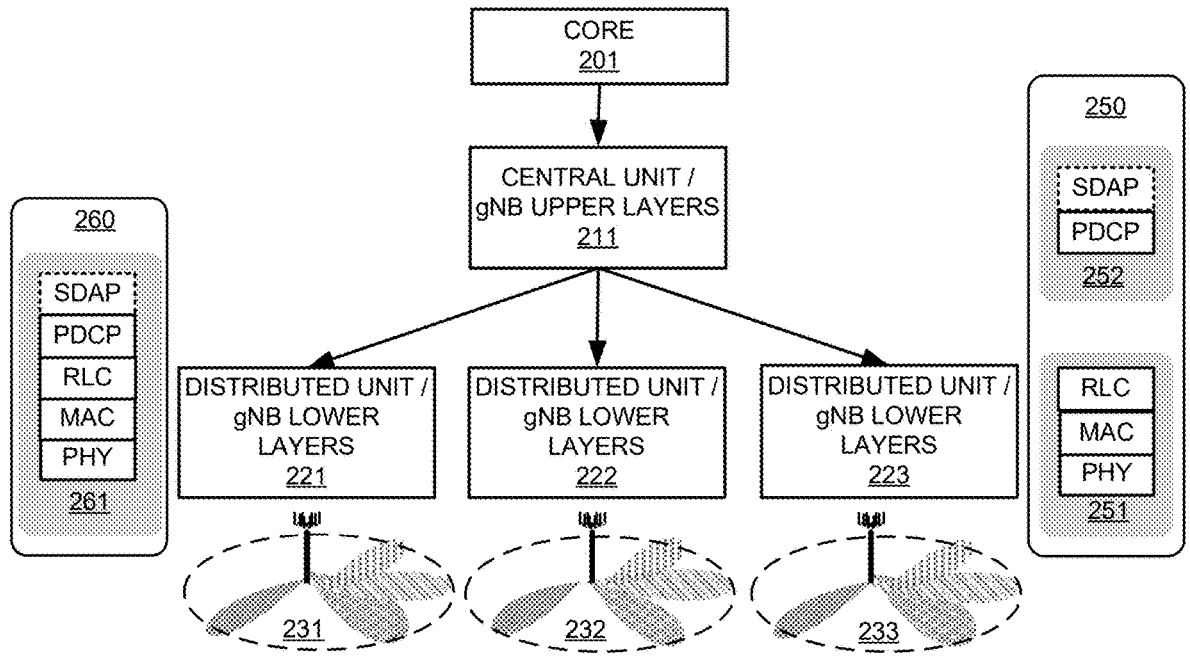
FIG. 2 illustrates an exemplary NR wireless system with centralized upper layers of the NR radio interface stacks.

FIG. 2 illustrates an exemplary NR wireless system with centralized upper layers of the NR radio interface stacks. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 3:
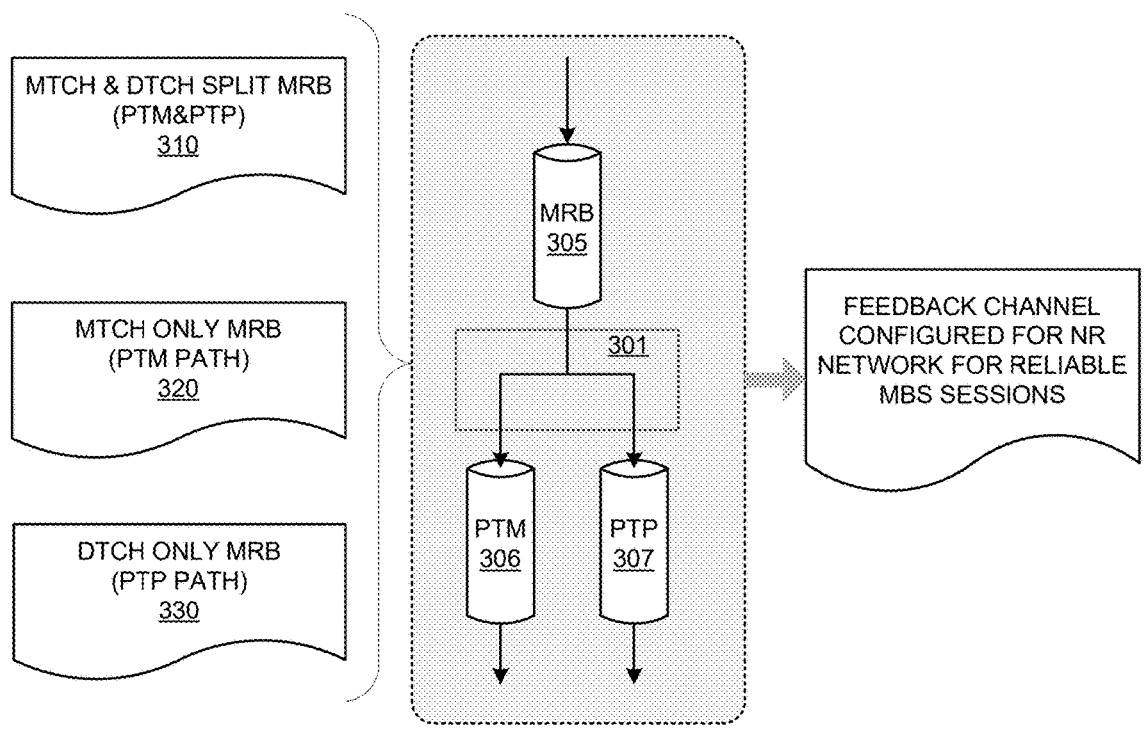
FIG. 3 illustrates exemplary MRB configuration in accordance with embodiments of the current invention.

FIG. 3 illustrates exemplary MRB configuration in accordance with embodiments of the current invention. Multicast radio bearer 305 provides multicast service, which is carried by multicast traffic channel (MTCH) of a point to multipoint (PTM) 306, a dedicated traffic channel (DTCH) of a point to point (PTP) 307, or both MTCH 306 and DTCH 307 with a UE protocol stack 301. In one embodiment 320, the MRB is configured to be associated to a MTCH. In another embodiment 330, the MRB is configured to be associated to a DTCH. In yet another embodiment 310, the MRB is configured to be associated to a MTCH and a DTCH. In embodiment 310, the MRB is configured in PTM&PTP transmission mode. One or multiple MRBs are established corresponding to the multicast flows of a particular multicast session in order to support the multicast transmission in the downlink over the air. The multicast Radio Bearer (i.e., RB) can be subject to PTM and/or PTP transmission within a cell. In embodiment 320, the MRB is configured in PTM transmission mode. In embodiment 330, the MRB is configured in PTM mode. In embodiment 310, the MRB is configured in PTM&PTP transmission mode.

In certain systems, such as NR systems, NR multicast/broadcast is transmitted in the coverage of a cell. In one embodiment, MCCH provides the information of a list of NR multicast/broadcast services with ongoing sessions transmitted on MTCH(s). At physical layer, MTCH is scheduled by gNB in the search space of PDCCH with G-RNTI scrambled. UE decodes the MTCH data for a multicast session in the multicast PDSCH. In legacy system supporting MBMS/eMBMS, the radio bearer structure for multicast and broadcast transmission is modelled in an independent way from unicast transmission. Because of the unidirectional transmission for legacy MBMS/eMBMS service, RLC unacknowledged mode (UM) node is used for the transmission of MBS session. In this case there is no need to make the interaction between multicast and unicast for a particular UE which is in RRC CONNECTED state. For the NR network, with new services provided through MBS, reliable transmission is required. The traditional multicast transmission does not ensure successful reception for all UEs, unless very conservative link adaptations are implemented, which greatly degrades the resource efficiency. To support the reliable transmission for NR multicast service, a feedback channel in the uplink is needed for each UE receiving the service, which can be used by the receiving UE to feedback its reception status about the service to the network. Based on the feedback, the network may perform necessary retransmission to improve the transmission reliability. From uplink feedback perspective, the feedback channel may be used for L2 feedback (e.g., RLC Status Report and/or PDCP Status Report). In addition, the feedback channel may be used for HARQ feedback. Furthermore, the feedback should be a bidirectional channel between the UE and the network, with the assumption that the network may take that channel to perform needed packet retransmission. The said packet retransmission is L2 retransmission (e.g., RLC retransmission and/or PDCP retransmission). In addition, the feedback channel may be used for HARQ retransmission.

Figure 4:
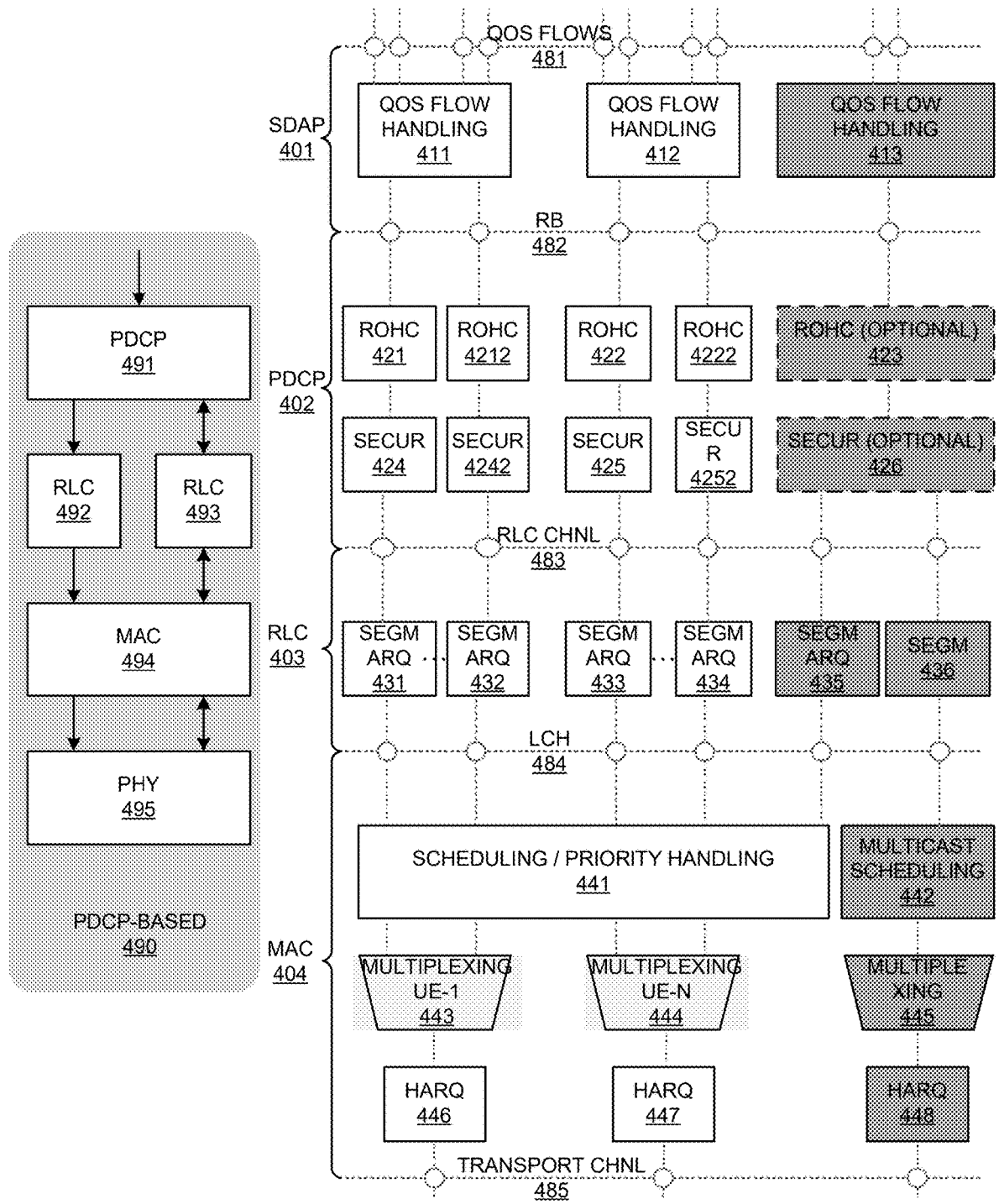
FIG. 4 illustrates an exemplary protocol stack for a MRB configuration with PDCP-based retransmission.

FIG. 4 illustrates an exemplary protocol stack for a MRB configuration with PDCP-based retransmission. In the PDCP-based retransmission 490, there is one PDCP entity 491 per MRB. Two logical channels, i.e., MTCH and DTCH are associated to the PDCP entity. Each logical channel is corresponding to a RLC entity, RLC 492 corresponding to the MTCH and RLC 493 corresponding to the DTCH. From UE aspect, the PDCP status report to trigger PDCP retransmission is delivered to the RLC entity 493 corresponding to DTCH. From network aspect, the PDCP protocol data units (PDUs) subject to retransmission are delivered through DTCH. The MAC entity maps the logical channel MTCH to the transport channel 1 (e.g., MCH, DL-SCH) and maps the logical channel DTCH to the transport channel 2 (e.g., MCH, DL-SCH). UE monitors two independent transport channels via different radio network temporary identifiers (RNTIs). The ROHC function and security function are optional for multicast transmission. The RLC layer includes only segmentation and the ARQ function of RLC layer is moved to PDCP layer. RLC 492 and RLC 493 maps to MAC 494 and send the data packets to PHY 495.

A network entity, such as a base station/gNB, transmits MBS data packets with PTM link to a number N of UEs and retransmits MBS data packets based on feedbacks through associated PTP link with the PDCP-based protocol stack. An exemplary UE, correspondingly configured with PDCP-based protocol stack receives MBS data packets on the PTM RB from the bases station and sends feedback to the base station. The multicast is scheduled independently from PTP transmission. The protocol stack for both the base station and the UE includes SDAP layer 401, PDCP layer 402, RLC layer 403, and MAC layer 404. SDAP layer 401 handles QoS flows 481, including functions at the base station of QoS flow handling 411 for UE-1 and QoS flow handling 412 for UE-N, and functions at the UE of QoS flow handling 413 for the UE. The PDCP layer 402 includes ROHC functions and security functions. The ROHC function and security function are optional for multicast transmission. PDCP layer 402 includes base station functions of ROHC 421 and security 424 for UE-1 multicast, ROHC 4212 and security 4242 for UE-1 unicast, ROHC 422 and security 425 for UE-N multicast, ROHC 4222 and security 4252 for UE-N unicast, and functions at the UE of ROHC 423 and security 426. RBs 482 are handled in PDCP layer 402. The RLC layer 403 includes both segmentation and ARQ function at base Station of segmentation and ARQ 431 for UE-1 multicast, segmentation and ARQ 432 for UE-1 unicast, segmentation and ARQ 433 for UE-N multicast, segmentation and ARQ 434 for UE-N unicast, as well as UE functions of segmentation and ARQ 435 for the unicast channel of the UE, and segmentation and ARQ 436 for the multicast channel. RLC channels 483 are handled in RLC layer 403. MAC layer 404 includes functions of scheduling and priority handling 441 at the base station, multiplexing 443 and HARQ 446 for UE-1 at the base station, multiplexing 444 and HARQ 447 for UE-N at the base station; and functions for the UE of scheduling and priority handling 442 of the UE, multiplexing 445 of the UE and HARQ 448 of the UE. Logic channels 484 and transport channels 485 are handled at MAC layer 404.

Figure 5:
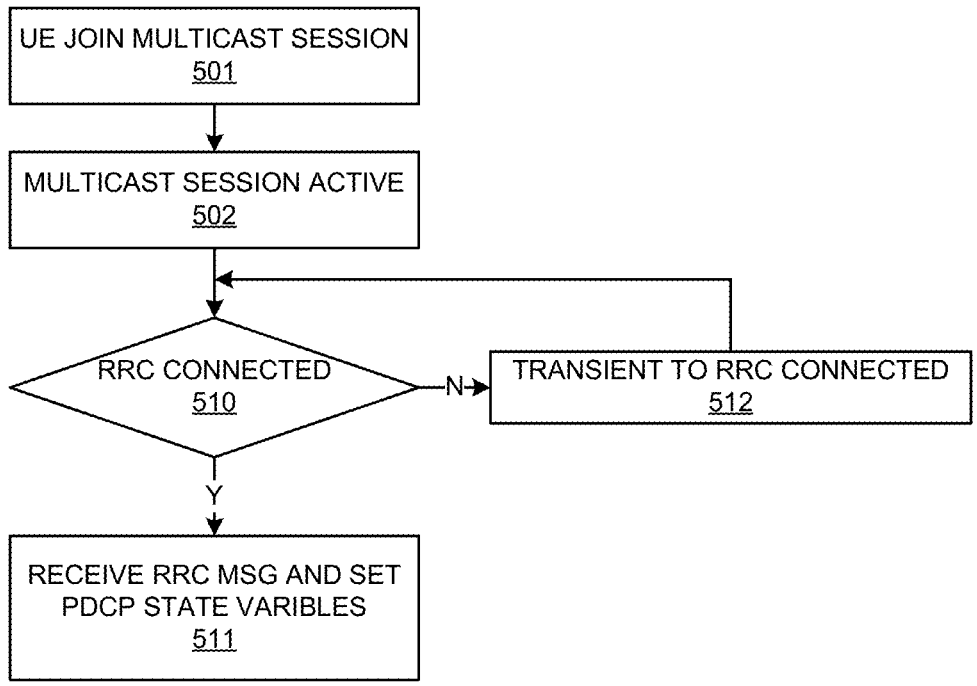
FIG. 5 illustrates an exemplary flow diagram of conditions for UE RRC states when MBS sessions are active in accordance with embodiments of the current invention.

FIG. 5 illustrates an exemplary flow diagram of conditions for UE RRC states when MBS sessions are active in accordance with embodiments of the current invention. The UE is configured with one or more MBS services. At step 501, the UE joins a multicast/MBS session. In one embodiment, a request is sent from the UE to join the MBS session. After UE joined multicast session, in one embodiment, the UE joins an active MBS session, i.e., the MBS session is active at step 502 when the UE joins. In other scenarios, the MBS session is not active and when the MBS session activates, the UE will receive a session activation notification. In some scenarios, the UE transit to RRC IDLE/INACTIVE states for power saving when the MBS session was not active. In other scenarios, the UE may stay in RRC CONNECTED state for other receptions when the MBS session was not active. The RRC CONNECTED state UE may stay in the RRC CONNECTED state or transits to RRC IDLE/INACTIVE state if the MBS session is not active. When multicast session activates, UE receives session activation notification and detected that the MBS session is active at step 502. Upon detecting the MBS session is active, at step 510, the UE determines if the UE is in the RRC CONNECTED state. If step 510 determines no, the UE transits to RRC CONNECTED state at step 512. If step 510 determines yes, at step 511, the UE in the RRC CONNECTED state receives RRC signaling to set initial PDCP state variables.

Figure 6:
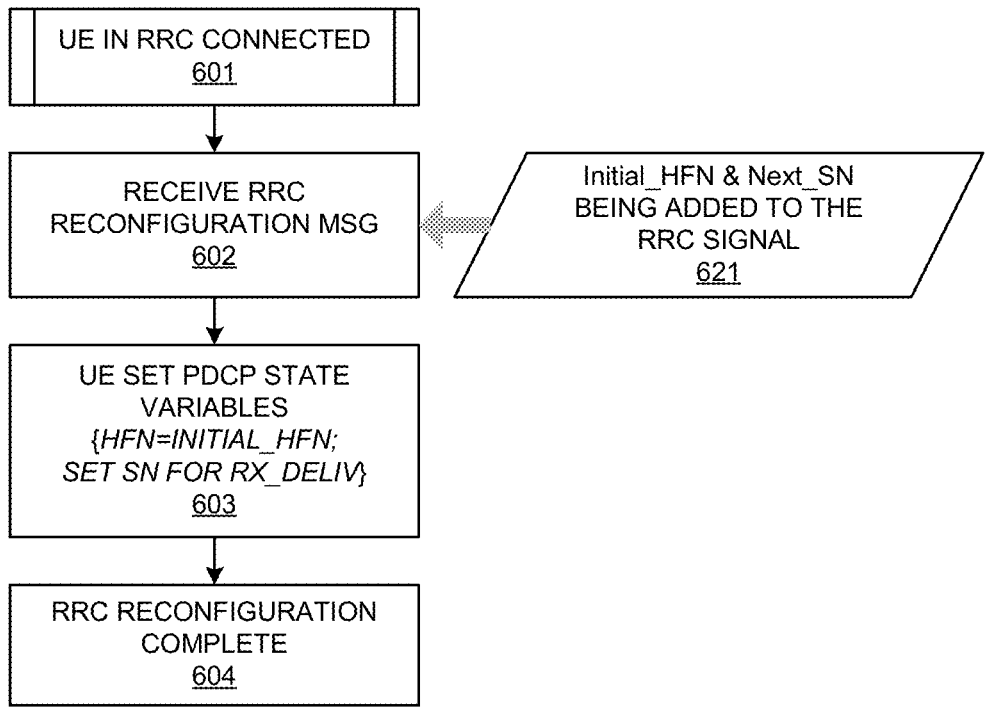
FIG. 6 illustrates an exemplary flow diagram of conditions for setting the PDCP state variables based on network information for multicast services in accordance with embodiments of the current invention.

FIG. 6 illustrates an exemplary flow diagram of conditions for setting the PDCP state variables based on network information for multicast services in accordance with embodiments of the current invention. At step 601, the UE is in the RRC CONNECTED state. In one embodiment, the MBS session is activated. At step 602, the UE receives message from network for detailed RRC configuration. In one embodiment, the network message is an RRC message. According to some embodiments, the RRC message is a RRCReconfiguration message, a RRCResume message, or a RRCSetup message. The wireless network indicates the SN of the first PDU will be transmitted to UE (e.g., next_SN) and corresponding HFN value (e.g., initial_HFN). In one embodiment 621, the indicator is provided by RRC Reconfiguration message, with the initial_HFN and next_SN information added to the RRC message. In one embodiment, the indicator is provided by RRC Setup/Resume signal according to RRC states of UE (not shown). At step 603, the UE sets HFN to the value of the HFN indicated by the network, which is the initial_HFN in the RRC message; and set SN of RX_DELIV and/or RX_NEXT to the SN of the first PDU will be transmitted by the network, which is the next_SN in the RRC message. After the UE applies the RRC configurations, at step 604, the UE transmits a RRC message, such as RRCReconfigurationComplete message to the wireless network.

Figure 7:
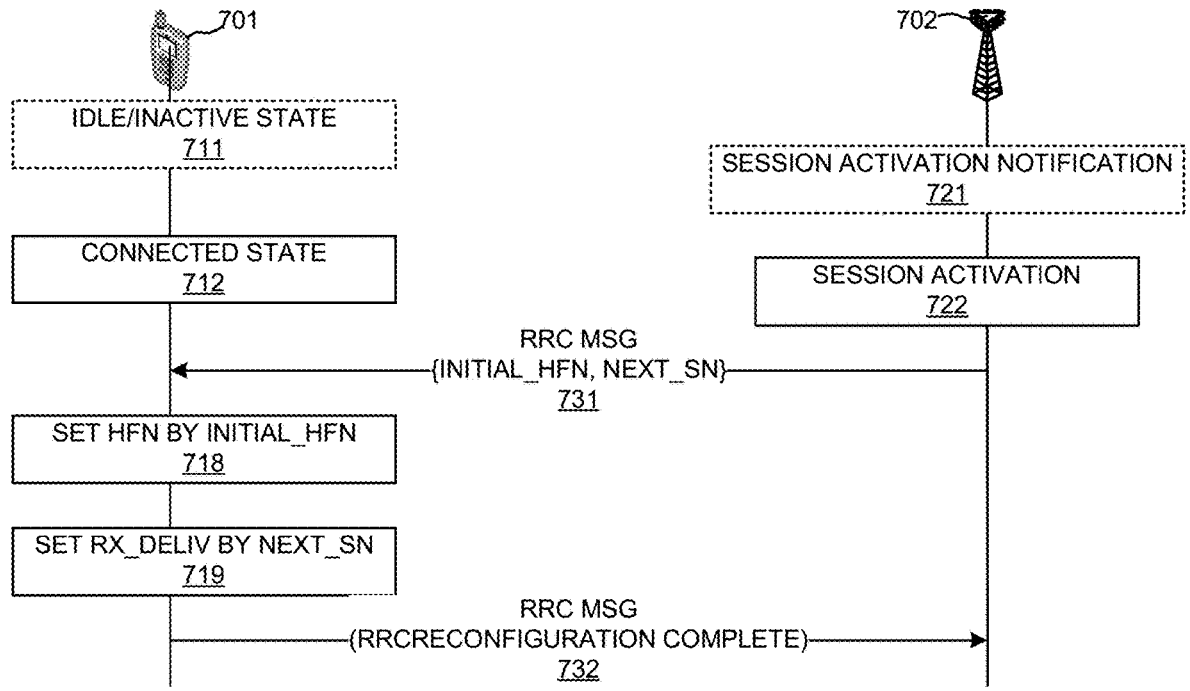
FIG. 7 illustrates an exemplary message diagram of setting the PDCP state variables based on the received network information for multicast services in accordance with embodiments of the current invention.

FIG. 7 illustrates an exemplary message diagram of setting the PDCP state variables based on the received network information for multicast services in accordance with embodiments of the current invention. A UE 701 is configured with one or more MBSs in a wireless network with a gNB 702. Considering different scenarios before the UE receiving data packets from a configured MBS. In one scenario 711, UE 701 is in the RRC IDLE/INACTIVE state. In another scenario, the MBS session is not activated. At step 721, the network notifies to activate MBS session. In one embodiment, gNB 702 sends an MBS session activation notification to one or more UEs, including UE 701. In one embodiment, the MBS session activation notification is broadcasted. In one embodiment, the MBS session activation notification is unicasted to each UE. In some scenarios, the MBS session becomes activated when UE 701 is the RRC IDLE/INACTIVE state, while in other scenarios, UE 701 is in the RRC CONNECTED state. The MBS session becomes activated before or after UE 701 determines to join the session. In one embodiment, UE 701 is in RRC CONNECTED before session activate. UE 701 receives unicast services simultaneously. In this case, network will transmit RRC reconfiguration message without additional session activation notification. In one embodiment, UE is in RRC IDLE/INACTIVE state before session activate. The UE needs to monitor session activation notification. After network notify session activation, UE transits to RRC CONNECTED states to receive multicast service. In one scenario, at step 712, UE 712 enters RRC CONNECTED state. At step 722, the MBS session is activated.

When the MBS session is activated and UE 701 is in the RRC CONNECTED state, the UE receives from the network the HFN and SN values for the UE PDCP state variables for the active MBS session. In one embodiment, at step 731, UE 701 receives RRC signaling for detailed RRC configuration. The RRC signaling from the network includes one or more configuration values for the UE PDCP state variables of the MBS session, including an HFN value, such as the initial_HFN, and an SN value, such as the next_SN. In one embodiment, RRC Reconfiguration message is used from network with the indicator of HFN and the SN of the next PDCP PDU to be transmitted. At step 713, UE 701 sets HFN to initial_HFN included in the RRC message from the network. At step 718, UE 701 sets HFN to initial_HFN. At step 719, UE 701 sets SN parts of RX_DELIV to next_SN. Optionally, UE 701 sets SN parts of RX_NEXT to next_SN. After finishing RRC reconfiguration including PDCP state variables initialization, at step 732, UE 701 submits RRCReconfigurationComplete message to the network.

Figure 8:
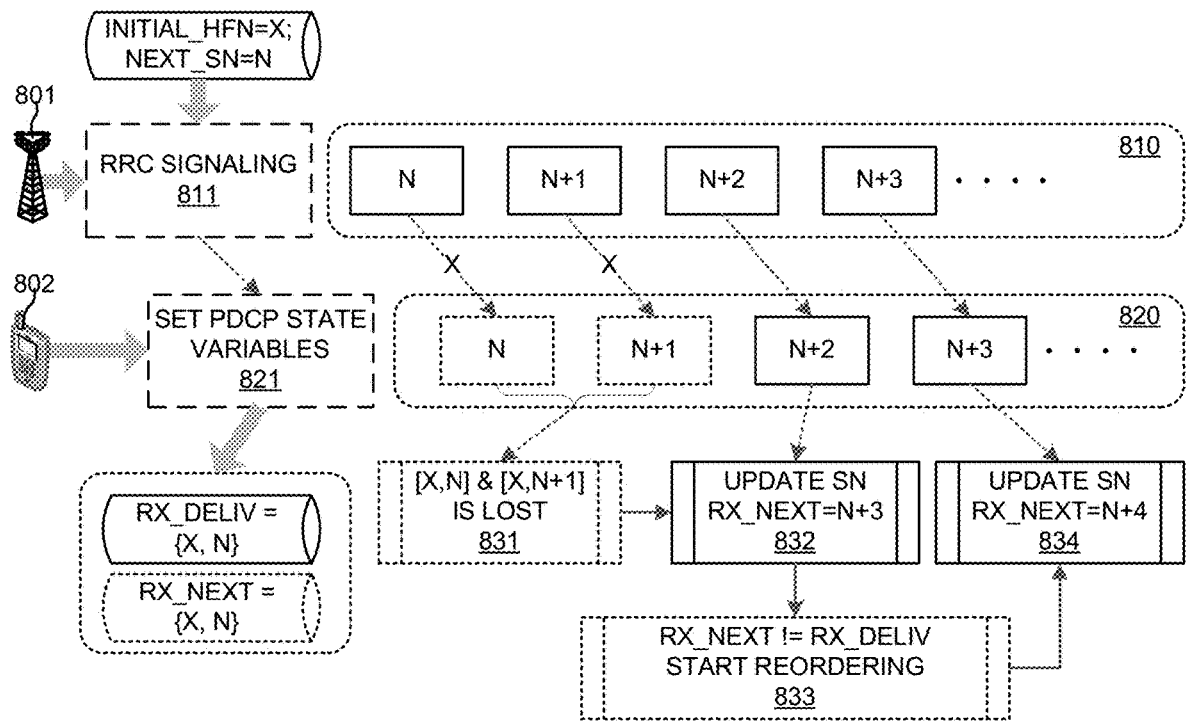
FIG. 8 illustrates an exemplary diagram for setting the UE PDCP state variables indicated by the network in accordance with embodiments of the current invention.

FIG. 8 illustrates an exemplary diagram for setting the UE PDCP state variables indicated by the network in accordance with embodiments of the current invention. A UE 802 is configured with one or more MBSs in a wireless network with a gNB 801. When UE 802 establish an MRB, initial value of PDCP state variables will be transmitted in RRC signaling. At step 811, gNB 801 sends an RRC message/ signal with configuration values for PDCP state variables, including an HFN value and an SN value. At step 821, UE 802 sets PDCP state variables based on the configuration values received from the RRC message. Assuming that the value of the initial HFN indicated by the network is X and the SN of the next PDCP PDU to be transmitted is N. The network sends data packets 810 with SN of N, N+1, N+2, N+3, and etc.

In one embodiment, UE may receive subsequent data PDUs earlier than RRC signaling (not shown). The UE receives MBS data packets 820 and processes the received packets based on the network configuration values for the UE PDCP state variables. In one embodiment, UE have to receive MBS data PDUs after receiving RRC signaling. The UE stores one or more PDCP PDUs in reception buffer when the one or more PDCP PDUs are received before receiving one or more configuration values for PDCP state variables from the wireless network. Subsequently, the UE processes the stored PDCP PDUs when one or more configuration values from the wireless network are received and applied. Upon receiving the RRC signal with the configuration values for the UE PDCP state variables, the UE sets HFN=X, SN parts of RX_DELIV=N. As illustrated, SN part of RX_NEXT will be updated according to the SN of received PDUs. At step 831, if some PDUs is lost (assume [X,N] and [X,N+1] is lost), UE will update RX_NEXT to the SN of the next received PDU+1. At step 832, the RX_NEXT is updated to N+3. At step 833, upon determining that RX_NEXT is not equal to RX_DELIV, the UE start reordering when processing the stored PDCP PDUs. At step 834, the RX_NEXT is update to N+4. In subsequent reception, if PDCP PDU with COUNT [X,N] is successfully received, SN parts of RX_NEXT and RX_DELIV will be updated to N+1.

Figure 9:
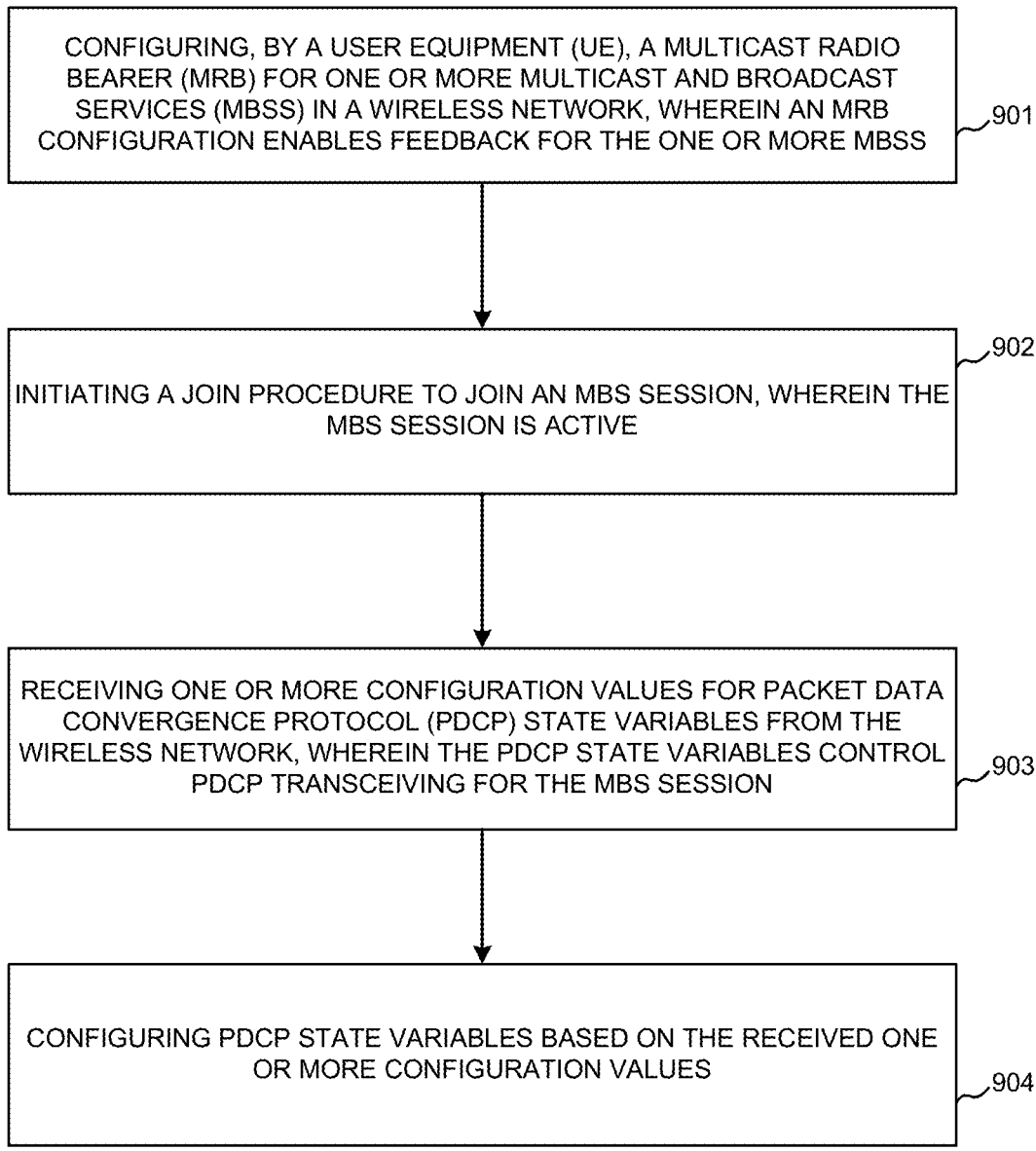
FIG. 9 illustrates an exemplary flow chart for the UE receiving one or more configuration values for UE PDCP state variables for an MBS session from the network and setting the PDCP state variables in accordance with embodiments of the current invention.

FIG. 9 illustrates an exemplary flow chart for the UE receiving one or more configuration values for UE PDCP state variables for an MBS session from the network and setting the PDCP state variables in accordance with embodiments of the current invention. At step 901, the UE configures an MRB for one or more MBSs in a wireless network, wherein an MRB configuration enables feedback for the one or more MBSs. At step 902, the UE initiates a join procedure to join an MBS session, wherein the MBS session is active. At step 903, the UE receives one or more configuration values for PDCP state variables from the wireless network, wherein the PDCP state variables control PDCP transceiving for the MBS session. At step 904, the UE configures PDCP state variables based on the received one or more configuration values.

Figure 10:
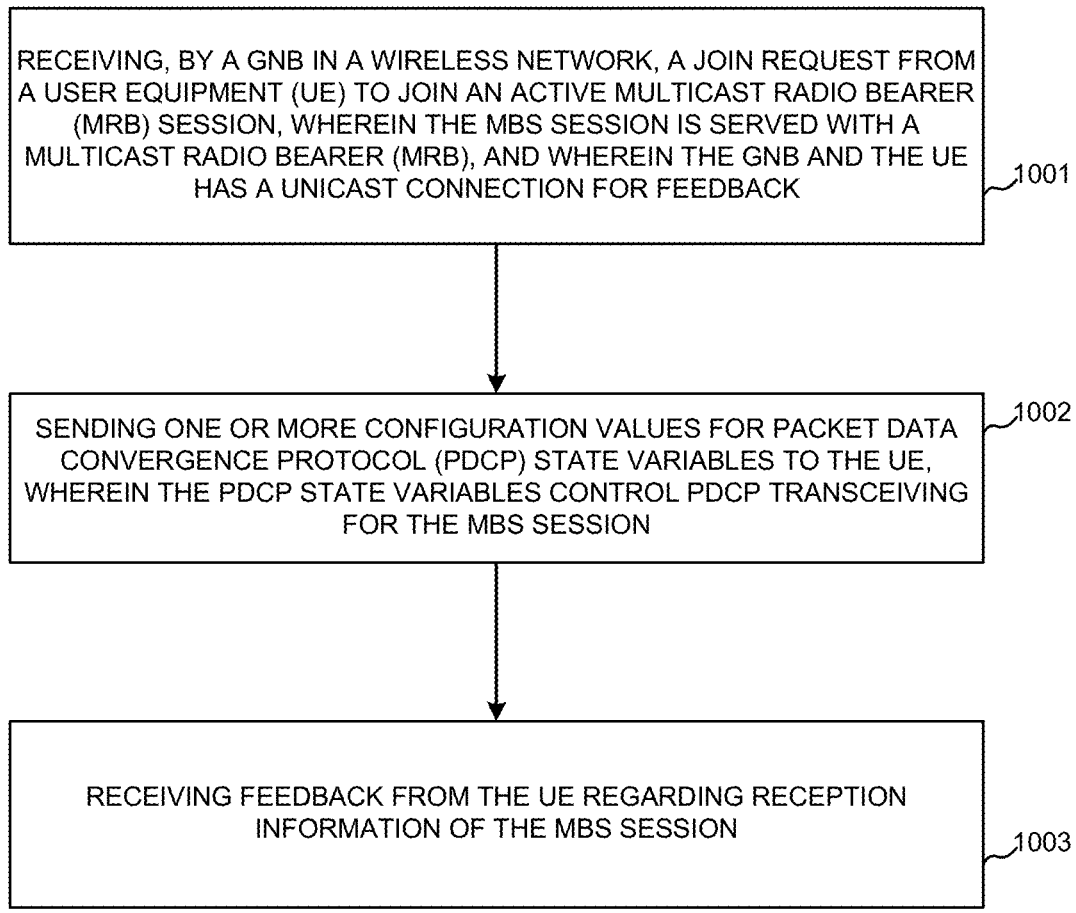
FIG. 10 illustrates an exemplary flow chart for the base station sending one or more configuration values for UE PDCP state variables for an MBS session in accordance with embodiments of the current invention.

FIG. 10 illustrates an exemplary flow chart for the base station sending one or more configuration values for UE PDCP state variables for an MBS session in accordance with embodiments of the current invention. At step 1001 the base station/gNB receives a join request from a UE to join an active MBS session, wherein the MBS session is served with an MRB, and wherein the base station/gNB and the UE has a unicast connection for feedback. At step 1002, the base station/gNB sends one or more configuration values for PDCP state variables to the UE, wherein the PDCP state variables control PDCP transceiving for the MBS session. At step 1003, the base station/gNB receives feedback from the UE regarding reception information of the MBS session.

What is claimed is:

1. A method comprising:
configuring, by a user equipment (UE), a multicast radio bearer (MRB) for one or more multicast and broadcast services (MBSs) in a wireless network, wherein an MRB configuration enables feedback for the one or more MBSs;
initiating a join procedure to join an MBS session, wherein the MBS session is active;
receiving one or more configuration values for packet data convergence protocol (PDCP) state variables from the wireless network, wherein the PDCP state variables control PDCP transceiving for the MBS session; and
configuring PDCP state variables based on the received one or more configuration values, and wherein the configuring of the PDCP state variable involves initializing an RX_DELIV value based on configuration values of hyper frame number (HFN) and sequence number (SN) received from the wireless network.

2. The method of claim 1, wherein the one or more configuration values for the PDCP state variables are received from a radio resource control (RRC) message.

3. The method of claim 2, wherein the RRC message is a RRCReconfiguration message, a RRCResume message, or a RRCSetup message.

4. The method of claim 1, wherein the one or more configuration values include a hyper frame number (HFN) and a sequence number (SN).

5. The method of claim 1, wherein the configuring of the PDCP state variable involves setting the RX_NEXT value based on the configuration value of HFN and SN received from the wireless network.

6. The method of claim 1, further comprising:
storing one or more PDCP packet data units (PDUs) in a reception buffer when the one or more PDCP PDUs are received before receiving one or more configuration values for PDCP state variables from the wireless network.

7. The method of claim 6, further comprising:
processing the stored one or more PDCP PDUs when one or more configuration values from the wireless network are received and applied.

8. A method comprising:
receiving, by a base station in a wireless network, a join request from a user equipment (UE) to join an active multicast broadcast service (MBS) session, wherein the MBS session is served with a multicast radio bearer (MRB), and wherein the bast station and the UE has a unicast connection for feedback;
sending one or more configuration values for packet data convergence protocol (PDCP) state variables to the UE, wherein the PDCP state variables control PDCP transceiving for the MBS session, and wherein the PDCP state variable includes configuration values of hyper frame number (HFN) and sequence number (SN), based on which the UE initializes an RX_DELIV value; and
receiving feedback from the UE regarding reception information of the MBS session.

9. The method of claim 8, wherein the one or more configuration values for the PDCP state variables are sent with a radio resource control (RRC) message.

10. The method of claim 9, wherein the RRC message is a RRCReconfiguration message, a RRCResume message, or a RRCSetup message.

11. The method of claim 8, wherein the one or more configuration values include a hyper frame number (HFN) and a sequence number (SN).

12. A user equipment (UE), comprising:
- a transceiver that transmits and receives radio frequency (RF) signal in a wireless network;
- a memory; and
- a processor coupled to the memory, the processor configured to configure a multicast radio bearer (MRB) for one or more multicast and broadcast services (MBSs) in the wireless network, wherein an MRB configuration enables feedback for the one or more MBSs;
- initiate a join procedure to join an MBS session, wherein the MBS session is active;
- receive one or more configuration values for packet data convergence protocol (PDCP) state variables from the wireless network, wherein the PDCP state variables control PDCP transceiving for the MBS session; and
- configure PDCP state variables based on the received one or more configuration values, and wherein the configuring of the PDCP state variable involves initializing an RX_DELIV value based on configuration values of hyper frame number (HFN) and sequence number (SN) received from the wireless network.

13. The UE of claim 12, wherein the one or more configuration values for the PDCP state variables are received from a radio resource control (RRC) message.

14. The UE of claim 13, wherein the RRC message is a RRCReconfiguration message, a RRCResume message, or a RRCSetup message.

15. The UE of claim 12, wherein the one or more configuration values include a hyper frame number (HFN) and a sequence number (SN).

16. The UE of claim 12, wherein the configuring of the PDCP state variable involves setting the RX_NEXT value based on the configuration value of HFN and SN received from the wireless network.

17. The UE of claim 12, further comprising:
- a PDCP processing module that stores one or more PDCP packet data units (PDUs) in a reception buffer when the one or more PDCP PDUs are received before receiving one or more configuration values for PDCP state variables from the wireless network.

18. The UE of claim 17, wherein the PDCP processing module further processes the stored PDCP PDUs when one or more configuration values from the wireless network are received and applied.

* * * * *